UNITED STATES PATENT OFFICE.

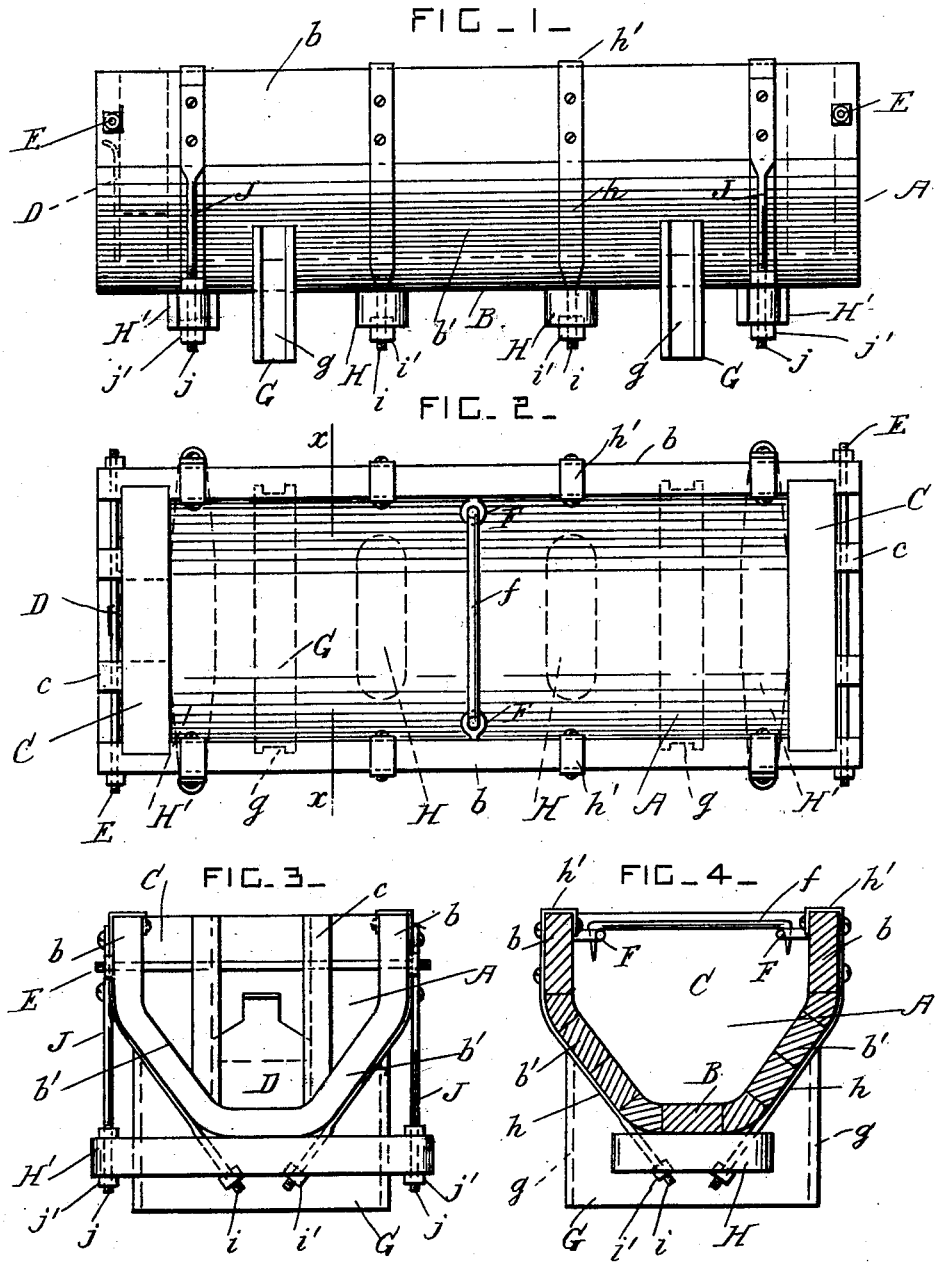

CARL BLOM, OF LAKE PARK, MINNESOTA, ASSIGNOR OF ONE-THIRD TO JOHN A. BERGREN AND ONE-THIRD TO JOHN H. MOAN, OF LAKE PARK, MINNESOTA.

GRAIN-TANK.

No. 897,814.     Specification of Letters Patent.     Patented Sept. 1, 1908.

Application filed April 27, 1907. Serial No. 370,674.

*To all whom it may concern:*

Be it known that I, CARL BLOM, a citizen of the United States, residing at Lake Park, in the county of Becker and State of Minnesota, have invented certain new and useful Improvements in Grain - Tanks; and I do hereby declare the following to be a full, clear, and exact description of the invention, such as will enable others skilled in the art to which it appertains to make and use the same.

This invention relates to tanks for transporting grain or other similar goods; and it consists in the novel construction and combination of the parts hereinafter fully described and claimed.

In the drawings, Figure 1 is a side view of the grain tank. Fig. 2 is a plan view of the same. Fig. 3 is an end view. Fig. 4 is a cross-section taken on the line $x-x$ in Fig. 2.

A is the body of the tank which is shaped like a trough. This body has a horizontal bottom piece B, vertical side pieces $b$ at its top, and inclined portions $b'$ between the said parts B and $b$. The body of the tank is formed of wooden bars or sections suitably jointed together.

C are the end pieces of the tank which are also made of wood, and are provided with bars $c$ for strengthening them.

D is the outlet door for the grain, which is slidable between two of the bars $c$ at one end of the tank.

E are tie-bolts at the ends of the tanks which pass through holes in the side pieces $b$.

F are eyes which project from the side pieces $b$ at the middle part of the tank, and $f$ is a tie-bar provided with downwardly projecting pointed ends which engage with the said eyes. This tie-bar is driven downwardly into engagement with the eyes, and it prevents the sides of the tank from spreading. It is easily removed when not required in use.

G are bolsters arranged under the bottom portion of the tank, and provided with vertical grooves $g$ in their ends for engaging with suitable stakes on the body of the car on which the tank is placed. The tank may be placed upon any convenient car or wagon and transported from place to place by rail or by road.

H are crosspieces arranged at intervals under the bottom of the tank, and $h$ are brace straps provided with hooks $h'$ at their upper ends which extend over and are secured to the top edges of the side pieces $b$. The lower ends of the brace straps are provided with screwthreaded portions $i$ and nuts $i'$ for securing them to the crossbars H in a manner which will press together the bars of which the body of the grain tank is formed.

H' are crosspieces similar to the crosspieces H, and provided with similar brace straps, but the crosspieces H' are longer than the crosspieces H, and J are vertical brace rods which are secured to the said brace straps and to the end portions of the crosspieces H'. The brace rods J have screwthreaded portions $j$ at their lower ends which are inserted in holes in the crosspieces H', and $j'$ are nuts which engage with the said screwthreaded portions $j$ and secure the brace rods to the crosspieces.

The grain tank may be provided with the long crossbars H' and the brace rods J for its entire length when a large tank is made, or for a small tank the brace rods may be omitted, or the two constructions may be combined as shown in the drawings.

A grain tank constructed according to this invention is built at a small expense, and affords a very satisfactory means for transporting grain and other similar goods from place to place.

What I claim is:

In a grain tank, the combination, with a trough-shaped body formed of a series of bars, and provided with end - pieces; of a series of crosspieces arranged under the said body, brace-straps arranged in pairs and secured to the upper part of the said body and provided with converging screwthreaded portions and nuts at their lower ends under the said body and engaging with all the said crosspieces, and reinforcing brace-rods also arranged in pairs and secured to the upper part of the said body and to the laterally projecting end portions of certain of the said crosspieces.

In testimony whereof, I have affixed my signature in the presence of two witnesses.

CARL BLOM.

Witnesses:
J. A. BERGREN,
J. H. MOAN.